United States Patent
Schaerer et al.

(10) Patent No.: US 6,830,468 B2
(45) Date of Patent: Dec. 14, 2004

(54) WIRING OF A MODULAR FURNITURE SYSTEM

(75) Inventors: Alexander Schaerer, Gümligen (CH); André Gerber, Thun (CH); Antonio Cassani, Münsingen (CH)

(73) Assignee: USM Holding AG, Gumligen (CH)

( * ) Notice: Subject to any disclaimer, the term of this patent is extended or adjusted under 35 U.S.C. 154(b) by 0 days.

(21) Appl. No.: 10/276,792

(22) PCT Filed: May 8, 2001

(86) PCT No.: PCT/CH01/00281
§ 371 (c)(1), (2), (4) Date: Nov. 19, 2002

(87) PCT Pub. No.: WO01/89050
PCT Pub. Date: Nov. 22, 2001

(65) Prior Publication Data
US 2003/0171017 A1 Sep. 11, 2003

(30) Foreign Application Priority Data
May 19, 2000 (EP) .......................... 00810634

(51) Int. Cl.[7] .............................................. H01R 4/64
(52) U.S. Cl. .......................... 439/215; 439/211; 174/48
(58) Field of Search ................................ 439/215, 210, 439/211; 174/48, 49

(56) References Cited

U.S. PATENT DOCUMENTS

| | | | |
|---|---|---|---|
| 4,781,609 A | * 11/1988 | Wilson et al. | ............... 439/215 |
| 4,924,032 A | 5/1990 | Akins | |
| 5,522,324 A | 6/1996 | van Gelder et al. | |
| 5,595,495 A | 1/1997 | Johnson et al. | |
| 5,606,919 A | * 3/1997 | Fox et al. | ................ 108/50.02 |
| 5,715,760 A | 2/1998 | Frascaroli et al. | |
| 5,826,385 A | * 10/1998 | Dykstra et al. | ............ 52/220.7 |
| 5,938,462 A | * 8/1999 | Wilson et al. | ............... 439/215 |
| 6,290,516 B1 | * 9/2001 | Gerber | ....................... 439/110 |
| 6,388,190 B1 | * 5/2002 | Laukhuf et al. | ............... 174/48 |

FOREIGN PATENT DOCUMENTS

| | | |
|---|---|---|
| DE | 196 21 547 A1 | 12/1997 |
| GB | 2 101 175 A | 1/1983 |
| WO | 98/38705 A1 | 9/1998 |

* cited by examiner

*Primary Examiner*—Tho D. Ta
*Assistant Examiner*—Xuong Chung-Trans
(74) *Attorney, Agent, or Firm*—Birch, Stewart, Kolasch, & Birch, LLP (57) ABSTRACT

Electrification of a furniture system which has a plurality of structural elements, formed for receiving functional furniture units, comprises multiple plugs (21 or 31) which can be fastened to a part of the structural element and cables (22 or 32) which are carried on a part of the structural element. The cables (22 or 32) have a predetermined length and serve as an electrical connection between multiple plugs (21 or 31) of two neighboring structural elements. The structural elements are preferably closed frames (1, 2 or 19), which are formed from at least two vertical longitudinal struts (5 or 6) and at least two horizontally connecting stays (3 or 4). The multiple plugs (21 or 31) are clipped on the longitudinal struts (5 or 6), in longitudinal slots (7) arranged therein, in such a way that they can be displaced along the longitudinal slots (7). A set incrementation or a fastening means protruding from the longitudinal struts (5 or 6) may also be provided.

19 Claims, 4 Drawing Sheets

WIRING OF A MODULAR FURNITURE SYSTEM

This application is the national phase under 35 U.S.C. § 371 of PCT International Application No. PCT/CH01/00281 which has an International filing date of May 8, 2001, which designated the United States of America.

TECHNICAL FIELD

The invention relates to a furniture system with electrification, the furniture system having a plurality of structural elements formed for receiving functional furniture units. Furthermore, the invention relates to a multiple plug which makes the electrification of the furniture system possible.

STATE OF THE ART

Nowadays virtually every workplace—whether in the office, laboratory or home—is provided with a computer. Even telephones are often no longer operated by the current from the telephone line alone, but like every other item of electrical equipment have to be connected to the power supply system. Finally, to satisfy individual requirements for light (that is in offices with a plurality of workplaces), additional desk lamps or floor lamps are often used.

Conventionally, an extension cable with a multipoint connector is laid on the floor and has the various loads connected directly to it. Experience shows that this results in a tangle of cables, which cannot be satisfactory from aspects of safety or esthetics. To avoid such a tangle of cables, cable ducts are also known. These are laid in or on the floor, the wall or the ceiling.

Specifically in the case of modular furniture systems, there have been a wide variety of approaches to a solution. On the one hand, DE-A 196 21 547 A1 (USM) discloses a modular interior furnishing system comprising a plurality of different functional units, such as carcasses, work-surfaces, partition panels, light fittings, etc., each structural element of the interior furnishing system taking the form of a free-standing, vertical, closed rectangular frame. In order that cables can be accommodated in the frame, ducts or grooves are provided in the latter. On the other hand, bus bars have been used for the electrification of modular furniture systems. Such an approach is disclosed, for example, in WO 98/38705.

A further possibility for electrification of an interior space-dividing system with a switching system is shown in U.S. Pat. No. 5,595,495 A (Johnson et al.). The switching system controls panel-mounted receptacle units. Each panel is provided with a pre-cabled electrical system and has on the lower side a cable duct in which the electrification is accommodated. The panels set up alongside one another are electrically interconnected by means of multiple plugs with a flexible electrical connector. A housing can engage in slots in the frame of the panels and be displaced vertically at set increments.

GB 2 101 175 A (Project Office Furniture Ltd) shows an electrification system for panel screens with cable ducts, in which the electrical supply is accommodated. The continuous cable ducts can be displaced vertically at set increments along the longitudinal struts of the panel screens. Lines are arranged in the cable ducts, and terminals and sockets are arranged at the ends. By means of terminals, the cable ducts are connected to one another with a short cable or a spiral cable. The cable ducts may also be of an open design, in order that, for example, a socket unit can be laterally displaced in the cable duct.

The majority of the known electrification systems are intended for installation in buildings. To be mentioned by way of example are bus bars for lighting and those for setting sockets at freely selectable locations. These arrangements conform to the common safety standards, but are quite large and complicated in their construction. In addition, bus bar systems for special applications are known, but they usually fail to satisfy safety requirements.

Cases of electrification of entire furniture systems are known from display cabinet construction. In these cases, the levels formed by the individual parts of the structural element are covered with glass plates or metal sheets. The electrification takes place, for example, by cables permanently installed in the longitudinal struts and defined taps for light fittings. The longitudinal struts may also have integrated bus bars. These embodiments usually operate on low voltage, in particular in the range from 12 to 24 V, in order that the profile size of the longitudinal struts remains within certain limits, so that an esthetic design of the furniture is still possible. In the case of all these known systems, modular extension, in particular also of the electrification, is possible only to a restricted extent.

If furniture systems are extended, reduced or changed over, the cabling must be laboriously adapted each time to the new situation. If the cabling of a furniture system was laid during construction—for example in the floor, the walls or the ceiling—, additional complex adaptations are necessary.

All the known systems do not satisfy the requirements which have to be met by a modular furniture system of today and the future.

SUMMARY OF THE INVENTION

The object of the invention is to provide electrification of a furniture system which prevents a tangle of cables and makes allowance for user-specific requirements, in particular in the case of modular furniture systems, to the extent that the electrification can be adapted by the user himself with minimal effort.

The way in which the object is achieved is defined by the features of claim 1. According to the invention, the electrification of the furniture system has a multiple plug which can be fastened to a part of the structural element. This multiple plug is fed by a cable of a predetermined length, which is carried by a structural element and serves as an electrical connection between multiple plugs of two neighboring structural elements of the furniture system.

By this system for electrification, a tangle of cables is prevented and the advantages of a modular furniture system are nevertheless retained. The modularity of the furniture system demands that, in spite of the cabling, the structural elements can be changed over, the number of structural elements can be increased or reduced. In particular, this must be possible quickly, easily and while ensuring orderly cable routing. The cable carried by a structural element of the furniture system may be accommodated, for example, in what is known as a cable duct or a recess in the structural element. Some other form of fastening to the structural element is also conceivable. The terminals of the cables are inserted into the multiple plug and consequently form a flexible and user-friendly electrical connection. The fastening of the multiple plug to a part of the structural element allows it to be attached at a height in a flexible range— within the constraints of the cable length available. Furthermore, the neighboring structural elements of the furniture system can be arranged in series against one another as desired.

To ensure the easy operation of, for example, lighting which is fastened to an upper part of the structural element, a switch or a button may also be fastened to a part of the structural element of the furniture system. Previously, the switch or button was often arranged directly on a light fitting. The upper part of the structural element is usually arranged at a height of 1.80 to 2.20 m, which sometimes makes it difficult to operate the light fitting and, for short people in particular, significantly impairs the ease of operating such a modular furniture system. This switch or button may also serve as a main switch of an entire group of items of electrical equipment (for example computers, printers, desk lamps, etc.). Apart from the use of switches or buttons, sensors may also be used.

One advantage is the displaceable fastening of the multiple plug and/or the switch or button. Specifically in the case of the switch or button, the height can consequently be set to the individual height of the user. In particular, the displaceable fastening possibilities of the multiple plugs allow a modular set-up of the structural elements to be ensured even when they are, for example, arranged at different distances from one another.

A slide-like design of the fastening means is preferred. This makes it possible for the multiple plug, for example, to be displaced as desired. The multiple plug is held in its position by friction. If additional securement is desired, the multiple plug can also be fixedly fastened. Such fixed fastening may take the form of a screwed connection.

To give the user reference points for suitable positioning of the multiple plugs, switches, buttons and sensors, a set incrementation may be predetermined. This comprises a relatively large number of predetermined positions at which, and only at which, these accessories can be fastened.

The modular furniture system comprises at least two longitudinal struts. For structural design reasons, the individual component parts of the electrification (for example multiple plugs, buttons or switches) are preferably fastened to these longitudinal struts. Depending on the basic form of the individual structural element (triangle, square or rectangle, trapezoid, polygon, etc.), the number of longitudinal struts may vary.

The furniture system preferably comprises a plurality of closed structural elements. Such a structural element is formed, for example, by a rectangular frame which comprises at least two lateral longitudinal struts and at least two horizontally arranged stays at the top and bottom. Such structural elements are described for example in WO 98/38705. At least one of the cables is preferably held directly or indirectly on one of these stays. Indirect holding can be realized by a cable carrier (which is designed for example in a dish-shaped form) being arranged on such a stay. In this case, the cable carrier is preferably designed in such a way that it can be clipped onto the corresponding stay by means of a snap mechanism. A dish in the form of a duct is preferably produced from plastic. If the edges of the profile leave a free space, at least on one side, between the stay and the edge of the dish, subsequently occurring cables can be unproblematically accommodated in this profile.

Furthermore, stand constructions which can be added to in order to form office landscapes are known. Such modular systems are described in U.S. Pat. No. 5,522,324 (van Gelder et al.) and in U.S. Pat. No. 5,715,760 (Frascaroli et al.). It is in accordance with the purposes of the invention that the electrification according to the invention can also be provided on such furniture systems.

A further variant of the configuration just described is a structural element which is formed by a closed cuboid. This comprises, for example, four lateral longitudinal struts which between them are provided with struts arranged at the top, bottom and depthwise. Such closed cuboids are known in particular from display cabinet construction.

The longitudinal struts are preferably designed in such a way that the multiple plug and the switch can be fastened at any desired height. The arrangement of the multiple plug is determined by the length of the cables used, of a predetermined length, which form the electrical connection. The fastening is preferably ensured by a clip-in mechanism in a longitudinal slot. Apart from the preferred design in the form of longitudinal slots, the fastening means on the frame may also be transverse slots, protruding studs or entire ridges. The multiple plugs are fastened to the protruding fastening means in a way analogous to the fastening in the longitudinal slots.

The clip-in mechanism is preferably designed in such a way that, after the fastening of the multiple plug to the fastening means of the frame, said plug continues to be displaceable. One variant of this is the predetermination of specific positions for the fastening means (for example set increments), at which the multiple plug is fastened. Displacement of the multiple plug is possible only at the specific positions.

It is obvious that other known systems which make it possible for a housing to be clipped into a recess can also be used. The longitudinal slots may be provided on all four sides of the longitudinal struts. However, two longitudinal slots are preferably arranged, lying opposite each other and located on the sides of the longitudinal struts which remain free after the fitting of working or usable surfaces of the furniture system or the arrangement of the structural elements in series. The longitudinal slots are preferably provided on the sides which are aligned parallel to the plane formed by the rectangular frame. These longitudinal slots may also serve for accommodating cables which lead from the multiple plug to the loads. Possibly occurring excess lengths of the cables can be accommodated in the longitudinal slots of the longitudinal struts. If, instead of longitudinal slots, studs are arranged as fastening means on the frame, cable ducts in which excess lengths of cables can be accommodated can also be clipped in.

The structural elements are preferably electrified from one side, from the right or left side in relation to a frontal view. For example, the multiple plug is fastened to the longitudinal strut which is further away from the connection to the power supply than the other longitudinal strut of the same structural element. If electrification takes place from the left side, in relation to a frontal view, the multiple plug is fastened to the right longitudinal strut. In the case of the neighboring structural element and every further structural element, the multiple plug is accordingly also attached to the right longitudinal strut. In the case of electrification from the right side, in relation to a frontal view, the arrangement is correspondingly mirror-inverted. This results in fastening of the multiple plug to the left longitudinal strut. The aim is to create comprehensive electrification (i.e. satisfying all the needs of the user in an individual case) with minimum possible use of cables of a standardized length. Uniformity within the overall interior installation is aimed for. It is in accordance with the purposes of the invention that the functionality of the furniture system and the needs of the users are at the forefront with respect to the arrangement of the multiple plugs.

Depending on local conditions and the individual wishes of the users, it is also conceivable to arrange the structural elements in a star-shaped manner. In this case, electrification from the ceiling or else from the floor at the center of the star-shaped arrangement would be preferred, but not mandatory. Furthermore, two structural elements can also have multiple plugs arranged mirror-invertedly. This is for the purpose that the multiple plug may be fastened to the left longitudinal strut, in relation to a frontal view, in the case of one structural element, and the next multiple plug, on the neighboring structural element, may be fastened to the right longitudinal strut, here, too, in relation to a frontal view.

Depending on the arrangement, it is also conceivable for one of the longitudinal struts to form the cable-carrying element of the structural element. In this case, the upper and lower horizontal stays would be provided with corresponding fastening means, in which the multiple plugs and/or switches or buttons would be clipped. For esthetic reasons, and to prevent the cables accommodated in the slots from coming out, covers, which can preferably be clipped in, are attached on this longitudinal slot. The mechanism which makes it possible for the cover to be clipped in may be designed in a way corresponding to the clip-in mechanism of the multiple plugs. These covers are adapted in situ to the existing arrangement, since they are interrupted by multiple plugs, switches and leads running off to electrical equipment.

In order that a tangle of cables is not created, the cable length is preferably to be limited. For esthetic and design reasons, the upper or lower horizontal stay is preferred as the carrying element of the overall structural element. As a result, the length of the cable which establishes the electrical connection between the structural elements of the furniture system is preferably the length of the horizontally connecting stay plus an excess length, which is approximately one fifth of the length of the longitudinal strut. The excess length may also correspond to the length of a longitudinal strut. Depending on the application and individual user wishes, intermediate sizes or user-specific lengths of the cables may also be used.

In the case of a symmetrical or identical arrangement of the multiple plugs on the longitudinal struts, the cables of the predetermined length consequently result in a placement of the multiple plugs in the lower region of the longitudinal strut, at approximately a height between one tenth and half the overall height of the corresponding longitudinal strut.

Office set-ups of today must offer flexibility and individuality and have developed increasingly into actual office landscapes (for example, integral interior furnishing systems). For this reason, certain elements, such as the lighting of such office landscapes for example, are centrally controlled. This cabling is separate from the actual electrification. However, in order here, too, to prevent a tangle of cables, these control elements are combined with the electrification of the furniture system. The additional holders for the control elements are, for example, detachably fastened to the longitudinal struts or directly to the multiple plugs. The fastening preferably takes the form of a clip-in mechanism. The construction of these holders is comparable to those [sic] of the multiple plugs of the electrical supply. Since the control elements are preferably operated in the low voltage range, the dimensions of these holders are reduced in comparison with those of the multiple plugs. It is preferred for the additional holders to be able to be fastened to the multiple plugs in different positions. The fastening means on the multiple plugs may also be designed in such a way that further multiple plugs can be fastened to them.

The cabling of the controller is preferably based on a standard, such as EIB, DALI or LON for example. A generally known standard which makes it possible to allow all stations to communicate bidirectionally with one another via a decentralized system is preferably used for the controller. In addition, energy and lengths of line can be saved by the use of such systems.

When such a standard is used, the button or switch may be replaced by a sensor. Like the button or the switch, the sensor is preferably displaceably fastened to one of the longitudinal struts, which, however, does not rule out the variant of integration on or in a multipoint connector. When actuated by a user, the sensor passes on to the central system the desired intervention in the central control of the lighting. In order that a general lighting concept can be retained in spite of the possibilities for manual intervention, it is conceivable to specify in the PC-supported control tolerance ranges which must not be exceeded. By such a restriction, it is possible to minimize disturbances at other workplaces caused by manual intervention at one of the workplaces.

A preferred design of a multiple plug for a modular furniture system comprises a housing and an exchangeable, clipped-in multiple coupling insert. Exchangability of the multiple coupling insert makes flexible use of the multiple plug possible. Depending on the alignment, the multiple plug can be adapted to the local conditions. In addition, exchangability also has advantageous effects on long-term use, in particular with respect to the housing. Should the multiple coupling insert be defective one day or if some other plug system is used in the future, the existing cabling can simply continue to be used, since only the multiple coupling insert has to be exchanged.

In order that a displaceable fastening of the multiple plug is possible, the housing has a clip-in mechanism at least on one outer side. This clip-in mechanism is made to clip or engage in the longitudinal slot, for example by two inwardly displaceable "tongues" of plastic, with pressure being applied to the outer side of the multiple plug lying opposite the clip-in mechanism. By pressing the "tongues" of plastic together, the multiple plug can be removed without destroying it and attached at another location. In theory, it would be conceivable to provide a clip-in mechanism for fastening the multiple plug to one of the longitudinal struts on more than one outer side of the housing. In the preferred design of the multiple plug, however, the three remaining outer sides are provided with fastening means for the holders of the control elements.

The fastening of the multiple coupling insert within the housing is designed in such a way that, on the one hand, the tensile forces occurring, which arise in particular when the cables are removed, can be absorbed and, on the other hand, later removal of the multiple coupling insert is possible. The multiple coupling insert is designed accordingly. Clip-in mechanisms made to match one another, which are already known on the market, are preferably used.

In a preferred embodiment, the outer sides of the housing of the multiple plug which have no clip-in mechanism for fastening the multiple plug, for example to a longitudinal strut, have recesses which serve as fastening means for the holders of the control elements. Since preferably only one outer side of the housing is provided with a clip-in mechanism, three different fastening possibilities for the holders of the control elements are obtained. In a modification of the configuration described, one or more outer sides of the housing of the multiple plug may also be designed in such a way that a further multiple plug can be fastened to them, in the manner of the multiple plugs for the electrification.

A multiple coupling insert which can be clipped into the housing preferably has at least one incoming feed and at least two taps. In this case, at least one of these taps is reserved for the further electrical connection of the neighboring structural element. In a preferred embodiment, which ensures optimum compactness of the multiple plug, two taps are arranged in one direction and one tap and the incoming feed are arranged in the opposite direction. The tap which is aligned in the same direction as the incoming feed is preferably the tap which serves for the further electrical supply to the neighboring structural element. The two other taps are preferably arranged in the direction of the electrical loads or the lighting.

To make global use of the modular furniture system with the electrification possible, and to keep the size of the multiple plug as small as possible, the terminals are preferably special plug systems. A plug system preferred for the electrification of the modular furniture system must, on the one hand, meet the various national requirements and, on the other hand, at the same time be approved in various countries. Various such plug systems are already available on the market (for example "gesis", Wieland Electric GmbH, Bamberg Germany). The dimensions of the multiple plug are dependent on the dimensions of the plugs of the selected plug system. The more compact the plug is made, the more compact the multiple plug also becomes.

An example of a compact plug has a rectangular form, in which the width is approximately one third of the length of the plug. In the case of such a plug, preferably three contact elements are arranged one behind the other, the middle contact element preferably being the grounding. The relatively flat design of such a plug allows two plugs to be arranged at a small distance from each other. This results in the preferred, approximately square basic form of the housing of the multiple plug of the electrical supply. The housing consequently has a cylindrical (prism) tubular form, dispensing with terminations underneath and on top, in order that the plugs can be plugged in and unplugged. The corners of the housing are preferably highly beveled. This provides an esthetic design of the housing and can at the same time serve for coding the plugs.

The height of the multiple plug is determined on the one hand by the design of the coupling and on the other hand by a guide part, which assists coding and meets safety and esthetic requirements for the accommodation of such a plug. Since the multiple plug for the control elements is clipped in on the multiple plug of the electrical supply, it is preferably of the same length and height as this multiple plug. The width is determined by the use of the corresponding plugs of the control elements. Here, too, various control element components are already available on the market. In the application of the control system, plugs which have to withstand a lower test voltage than is the case with plugs for electrification are used. This allows the holders of the control elements to be made smaller than the corresponding multiple plugs. This has a decisive influence in particular on the width of the holder of the EIB system. Such a holder, which may also be called a multiple plug of the control elements, has as a result only a width which is slightly greater than half the length of a multiple plug.

Further advantageous embodiments and combinations of features of the invention emerge from the following detailed description and the complete set of patent claims.

BRIEF DESCRIPTION OF THE DRAWINGS

In the drawings used for explaining the exemplary embodiment.

In principle, the same parts are provided with the same reference numerals in the figures.

WAYS OF IMPLEMENTING THE INVENTION

Figure 1:
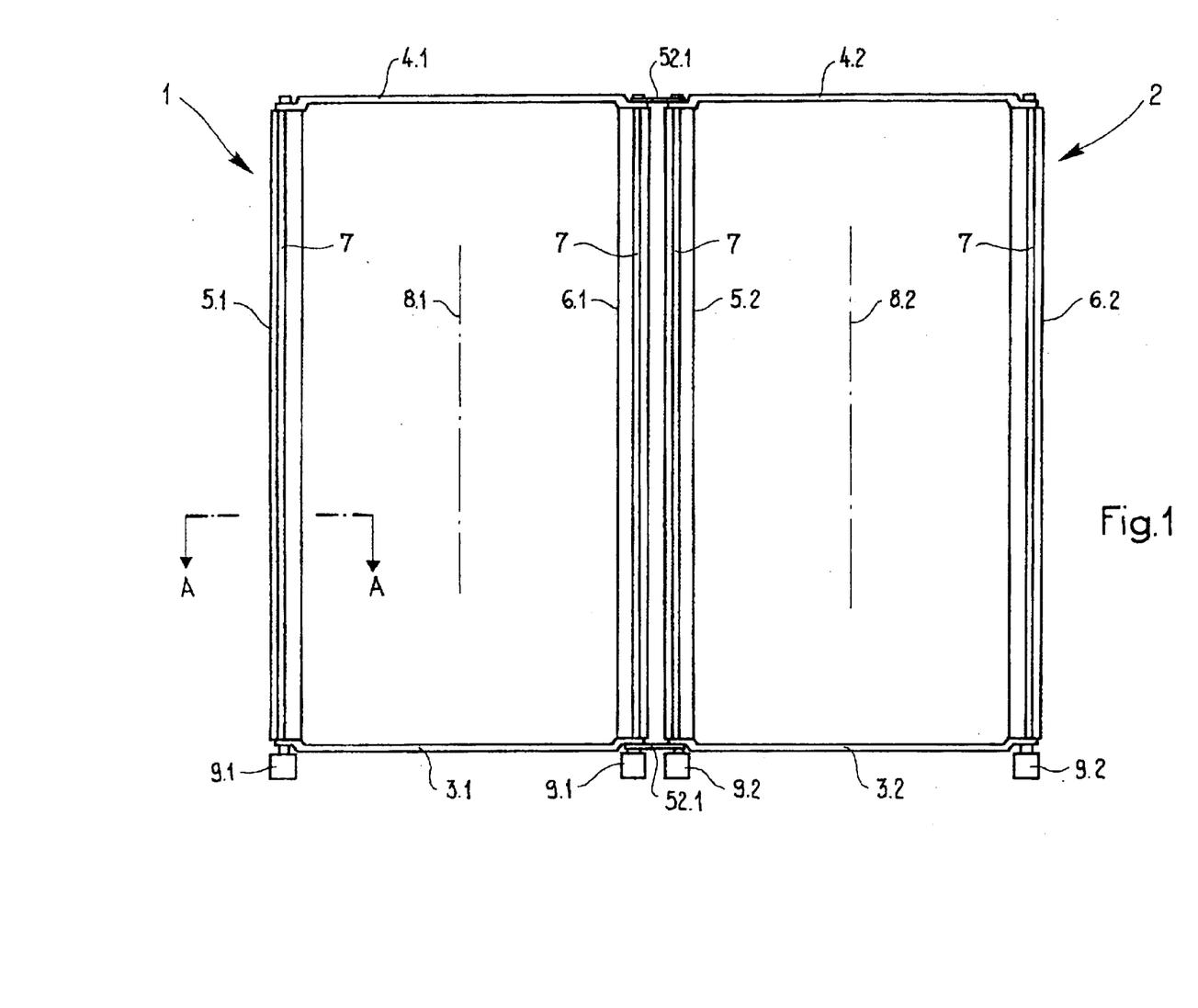
FIG. 1 shows an example of two neighboring structural elements in frontal view.

FIG. 1 shows an example of two neighboring structural elements in a frontal view. The terms "right" and "left" used hereafter relate in each case to the frontal view represented. The structural element of the modular furniture system is formed by a closed, vertical, rectangular frame 1 or 2. This frame 1 or 2 has at least one lower horizontal, connecting stay 3.1 or 3.2, an upper horizontal stay 4.1 or 4.2, a vertical longitudinal strut 5.1 or 5.2 arranged on the left and a vertical longitudinal strut 6.1 or 6.2 arranged on the right. The longitudinal struts 5 and 6 are provided with at least one slot 7, running in the longitudinal direction. For stability reasons, the slot 7 is preferably not arranged in the middle of the longitudinal struts 5 and 6, but directed outward, with respect to each individual frame. The arrangement of the slot 7 in the case of the longitudinal struts 5 and 6 is mirror-inverted with respect to the central axis 8.1 or 8.2 of the frame 1 or 2. The frame 1 or 2 preferably stands on four feet 9.1 or 9.2. These feet 9.1 or 9.2 may, for example, also be blockable rollers, in order that rapid changing-over or exchanging of the items of furniture or the frames 1 or 2 is possible.

To stabilize the individual structural elements 1 and 2 and create an approximately uniform distance between them, connections 52.1 or 52.2 may be arranged.

Figure 2:
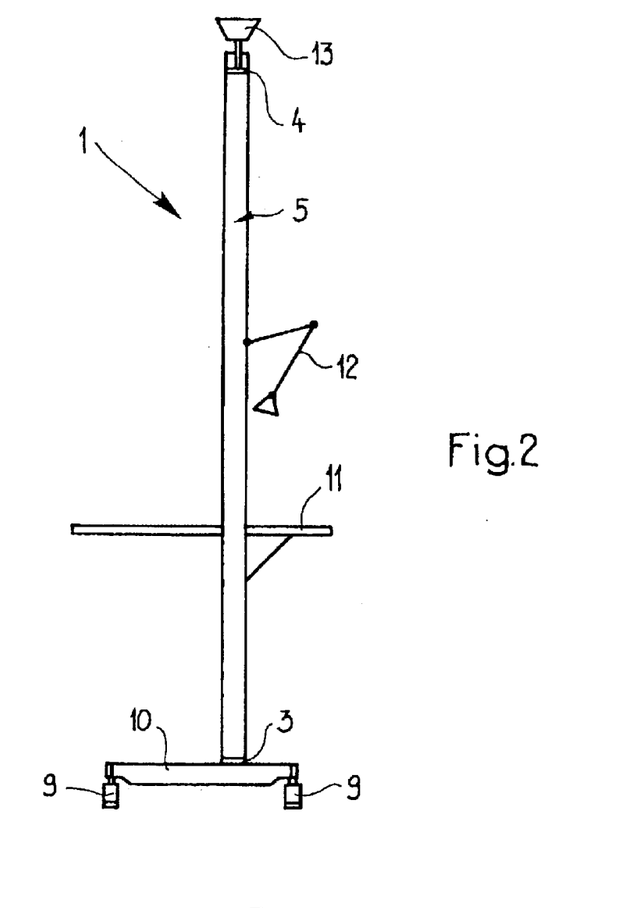
FIG. 2 shows an example of a structural element in side view.

In FIG. 2, a structural element (for example frame 1) is schematically represented in side view. In order that the stability of the overall frame 1 is ensured, the feet 9 are fastened to a cross member 10 at a distance from the plane formed by the closed, vertical, rectangular frame 1. This cross member 10 is arranged perpendicular to the lower horizontal stay 3. In comparison with FIG. 1, FIG. 2 is provided with additional accessories of the modular furniture system, by way of example. For instance, a work table 11 is attached at the height desired by the user. Electrical equipment can be placed on this work table 11. Preferably, a cable duct is in this case arranged under the board of the work table 11 on the side facing away from the user. A multipoint connector 20 is preferably accommodated in this cable duct. In addition, lighting elements are arranged here by way of example. These are a desk lamp 12 for direct lighting and a light fitting 13 for indirect lighting of the modular furniture system. In the case of this exemplary embodiment, the preferred arrangement of the slots 7 has been represented. A slot corresponding to the slot 7 has not been provided in the visible side of the longitudinal strut 5.1. As a result, it is possible for the frames 1 and 2 to be arranged closer together, because no electrification elements can be attached in accordance with the system on the sides, with respect to the frontal view. However, it is within the concept of the invention to provide slots 7 on all sides on the longitudinal struts 5.1 and 6.1. A furniture system of this type is disclosed, for example, by DE 196 21 547 A1.

Figure 3:
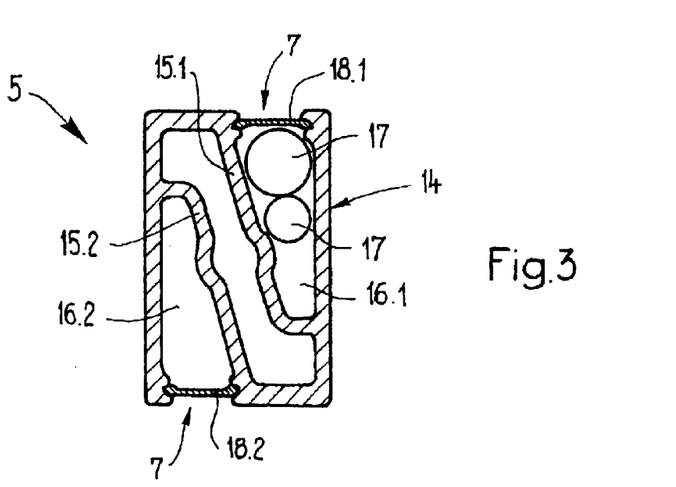
FIG. 3 shows a schematic section A—A through a longitudinal strut.

FIG. 3 shows the schematic section A—A through the longitudinal strut 5.1. The hollow profile 14 of the longitudinal strut 5.1, preferably an aluminum profile, is provided with reinforcements 15.1 and 15.2 for reasons of stability. Preferably, a further frame is arranged to the left of this hollow profile 14. To the right of this hollow profile 14, there is the usable space of the closed frame 1, in which, for example, carcasses or work tables 11 can be fastened. In this embodiment, given by way of example, the slots 7 are bounded on the one hand [sic] by the surround of the hollow profile 14 and the reinforcements 15.1 and 15.2 arranged in it. This produces two usable hollow spaces 16.1 and 16.2, in which the various cables 17 can be accommodated. In order that these cables 17 do not spill out, and in order that the cabling also satisfies esthetic requirements, the slots 7 are provided with covers 18.1 and 18.2, which can be clipped in. These covers 18.1 and 18.2 can be removed without destroying them and attached again. These covers 18 are preferably plastic profiles which are made thicker at the sides and can be elastically deformed to the extent that they can be inserted and easily removed again by pressing with a finger. These covers 18 are interrupted by clipped-in multiple plugs 21 or 31, buttons 25, leads running off to electrical equipment, etc. Therefore, the covers are preferably designed in such a way that they can be adapted by any user to the individual conditions by simple means, such as for example scissors.

Figure 4:
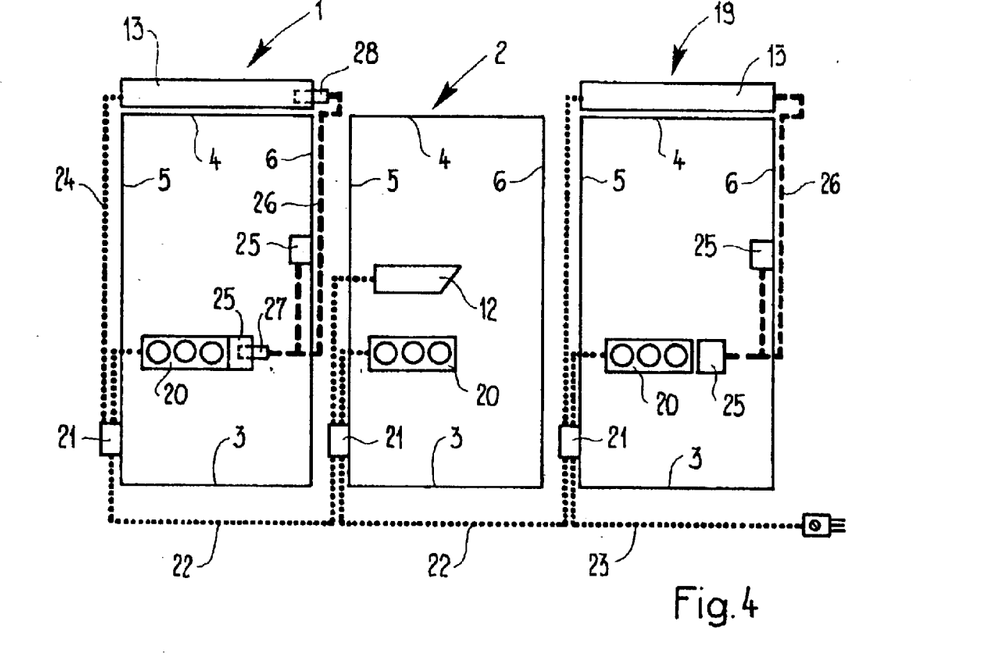
FIG. 4 shows an electrification concept (230 V) for a furniture system with a digital electronic ballast and external light switches.

FIG. 4 schematically represents an electrification concept for a modular furniture system with a digital electronic ballast and external light switches. This concept is used in the case of power supplies of 230 V and the lighting can be dimmed user-specifically or under central control. For better understanding of the concept, arranged alongside the frame 2 to the right is a further frame 19, so that three structural elements are standing next to one another. This arrangement is given by way of example and it is part of the concept of the modular furniture system that it can be added to or modified user-specifically. Furthermore, various accessories, such as the table lamp 12 in the frame 2, the light fitting 13 on the frames 1 and 19 and also multipoint connectors 20 on the frames 1, 2 and 19 for terminal electrical equipment for example, are represented. The multipoint connector 20 is preferably accommodated in a cable duct, which is fastened, for example, under a table board of a work table 11. In order that FIG. 4 and FIG. 5 do not look overcrowded, a work table 11 has not been represented, for example. In this arrangement, a multiple plug 21 is in each case displaceably fastened to the left longitudinal strut 5. The fastening in each case to the left longitudinal strut 5 is given by way of example. It is readily possible to begin the electrification from the left side, which would result in the multiple plug 21 being fastened to the right longitudinal strut 6. Here, too, the terms "left" and "right" relate to the frontal view. The fastening of the multiple plug 21 takes place by means of clipping into the slot 7 in the longitudinal strut 5 or 6. The exact way in which the clip-in mechanism functions is represented in the detailed description of FIG. 6. The height at which the multiple plug 21 is clipped in is determined by the length of the connecting cable 22 and is approximately in the lower tenth of the overall height of the frame 1, 2 or 19. Since the cables are preferably made to be of the same length, the fastening height is approximately the same for all the multiple plugs 21. The supply for the electrification takes place via the power supply cable 23. To prevent the power supply system from being overloaded by too many items of electrical equipment and to ensure greatest possible safety, in addition to the overload protection of the sockets provided during construction, the power supply cable 23 may also be provided with an overload protection. A special plug system is preferably used for the electrification. Consequently, a compact design is possible, in particular of the multiple plug 21. Furthermore, the same types of multiple plug 21 can be used in several countries. Various plug systems which are approved in several countries and satisfy the requirements which such a modular furniture system has to meet are available on the market. The "gesis" plug system of Wieland Electric GmbH, Bamberg Germany, may be mentioned here by way of example.

The multiple plug 21 preferably has an incoming feed 45 and three taps 46. This multiple plug 21 is explained in detail in the description of FIG. 6. The power supply cable 23 represented has at one end a nationally customary male plug. At the other end there is a female system plug, which is connected to the incoming feed 45 of a first multiple plug 21. From the first multiple plug 21 there leads a connecting cable 22 from one of the taps 46.1 to the incoming feed of a second multiple plug 21, which is clipped in on the longitudinal strut 5 of the neighboring frame 2. This connecting cable 22 has at one end a female system plug (outgoing feed) and at the other end a male system plug (tap). All the electrical items of equipment are either provided with system plugs or are supplied via a multipoint connector 20 which has nationally customary taps and is for its part connected to the multiple plug 21 via a male system plug.

In the case of the frame 1 or 19, the light fitting 13, for example for indirect lighting, is arranged on the upper horizontal stay 4. The light fitting is supplied with power by the connecting cable 24. The connecting cable 24 is preferably permanently connected at one end to the light fitting 13 and has at the other, free end a male system plug, which is connected to one of the two not yet used taps 46.2 of the multiple plug 21. For controlling the light fittings 13, arranged on each frame which has such a light fitting 13 are buttons 25, which are connected to the light fitting 13 via a separate control cable 26. Apart from the actual switching on and off function, it is also possible, by means of the button 25, to dim the luminous intensity of the light fittings 13 according to the wishes of the respective users. This button 25 may be integrated in or on the multipoint connector 20. A further possibility for arrangement of the button 25 is for it to be fastened to one of the longitudinal struts 5 or 6 in accordance with the principle of the multiple plug 21. The advantage of an arrangement of the button 25 on one of the vertical longitudinal struts 5 or 6 is the variably adjustable height which any user can fix himself according to his needs.

The control cable 26 is preferably fastened to the vertical longitudinal strut 5 or 6 which has remained free after arrangement of the connecting cable 22. In this example, the control cable 26 is fastened to the vertical longitudinal strut 6. The control cable 26 may be permanently connected at one end to the light fitting 13 and/or also to the button 25. On the other hand, an arrangement with a plug system is also conceivable. If the control cable 26 is connected at one end via a plug-in connection 27 to the button 25 and/or at the other end via a plug-in connection 28 to the light fitting 13, this decisively increases the flexibility of the modular furniture system. Should there at some point in time no longer be any need for lighting which can be dimmed or if the loghting is controlled centrally at a later point in time, the control cable 26 can in the case of this variant be unproblematically removed by any user himself. If at a later time there is again interest in lighting which can be dimmed, or a certain individual setting capability is wanted for centrally controlling the lighting, the control cable 26 can be conveniently connected by any user himself.

Apart from the control of the lighting by means of a button 25, the light fitting 13 itself may also have an on and off switch, if appropriate even a button similar to the button 25. In the preferred design of the frame 1, 2 or 19, it has a height of about 1.80 to 2.20 m. Since the light fitting 13 is preferably arranged on the upper stay 4, the ease of operation is greatly restricted however, since only tall people can unproblematically operate the control arranged directly on the light fitting.

Apart from the multipoint connector 20, additionally arranged by way of example on the frame 2 is a desk lamp 12. This desk lamp is preferably made to match the furniture system and has a cable which at one end is permanently connected to the desk lamp 12 and at the other end has a male system plug. This plug is connected to one of the two not yet used taps 46.2 of the multiple plug 21.

In the case of electrification of the modular furniture system with 120 V, it is possible to dispense with a digital electronic ballast. If lighting which can be dimmed is not desired, the button 25 can be replaced by an actual on/off switch. This switch may be arranged in accordance with the same principle as the button 25 and be fastened accordingly.

Figure 5:
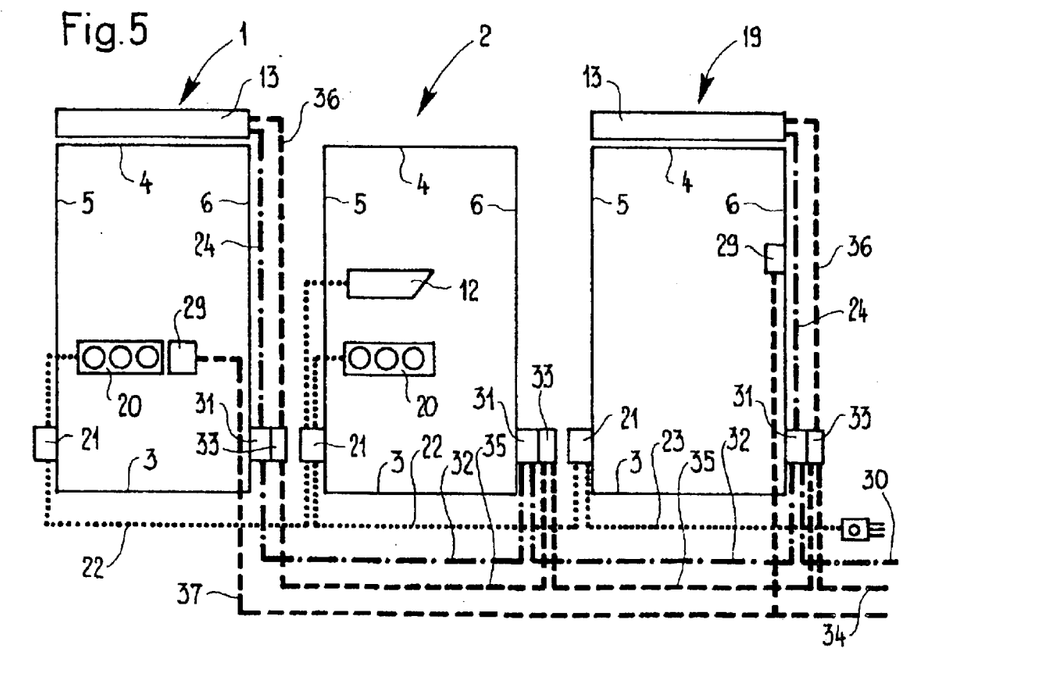
FIG. 5 shows an electrification concept (230 V) for a furniture system with a digital electronic ballast and EIB bus.

An electrification concept for a furniture system with a digital electronic ballast is also represented in FIG. 5. In the case of this concept too, the lighting can be dimmed, but is controlled by means of a controller, such as EIB, DALI or LON. In the exemplary embodiment, the application of an EIB controller is taken as a basis. When such a standard is used, the buttons 25 or switches represented in FIG. 4 are replaced by sensors 29. The sensors 29 are not supplied with a voltage of 230 V, but are based on a low voltage. As a result, the fire load requirement is reduced and smaller dimensioning of the sensor 29 and of the associated other control elements is made possible.

FIG. 5 shows an example of an arrangement of the various line systems which occur in the case of electrification of the furniture system controlled by an EIB system, given by way of example. All the lines may on the one hand [sic] be attached to or accommodated in the individual elements of the structural element. In principle, a distinction can be drawn between supply arrangements and control arrangements. On the one hand, there is a supply system for the general electrical equipment (for example PCs, printers, etc.), which is constructed in a way corresponding to the cabling arrangement as already described under FIG. 4. On the other hand, there is a second, separate supply system, which supplies the light fittings 13 with power. The supply system for the light fittings 13 conceptually comprises the same components as the supply system for the electrical equipment. Like the latter, it comprises a power supply cable 30, which is designed in a way corresponding to the power supply cable 23, and a multiple plug 31, which preferably corresponds to the multiple plug 21 of the power supply to the electrical equipment. The multiple plug 31 for supplying to the light fittings 13 is advantageously arranged on the opposite vertical longitudinal strut 6 of the frame 1, 2 or 19.

In this exemplary embodiment, the multiple plugs 31 are in each case fastened to the right vertical longitudinal strut 6 and the multiple plugs 21 are in each case fastened to the left vertical longitudinal strut 5. Here, too, the designations "right" and "left" relate to the frontal view represented. The frames 1, 2 and 19 are connected to one another by the connecting cables 32, which are designed in a way corresponding to the connecting cables 22. From the multiple plug 31 there leads a connecting cable 24 to the light fitting 13.

EIB multiple plugs 33 can be fastened to the multiple plugs 31. Since the multiple plugs 31 preferably have fastening means on the three sides which remain free after the multiple plug 31 has been fastened to one of the longitudinal struts 5 or 6, the EIB multiple plugs 33 can be clipped in on these three sides of the multiple plugs 31. Fastening of the EIB multiple plugs 33 to the multiple plugs 21 is also conceivable, since the multiple plugs 21 and 31 are preferably of the same design. From a decentralized system there leads an EIB connection line 34 to the EIB multiple plug 33 and in each case with [sic] a further EIB connecting line 35 from one EIB multiple plug 33 to the next EIB multiple plug 33. In the case of each [sic] frame, in this example the frame 1 or 19, to which a light fitting 13 is attached, there leads from the EIB multiple plug 33 an EIB connecting line 36 to the corresponding light fitting 13. With this control system it is possible, for example by PC-supported programming, to control the lighting of parts of or an entire office area of an integral office landscape by means of a decentralized system.

To allow account to be taken of the user-specific wishes, sensors 29 are arranged on or in the multipoint connector 20, making it possible for the user to influence individually the decentralized lighting control. The sensors 29 may also be fastened to one of the vertical longitudinal struts 5 or 6, as represented by way of example in the case of the frame 19. From the sensors 29 there lead separate EIB connecting lines 37 to the decentralized system, which controls the corresponding light fitting according to the user-specific wishes. To restrict impairments to neighboring and/or other workplaces, tolerances which do not disturb the basic concept of the lighting control of the overall office landscape, even when there is manual influence on the part of a user, may be fixed within the PC-supported control.

Figure 6A:
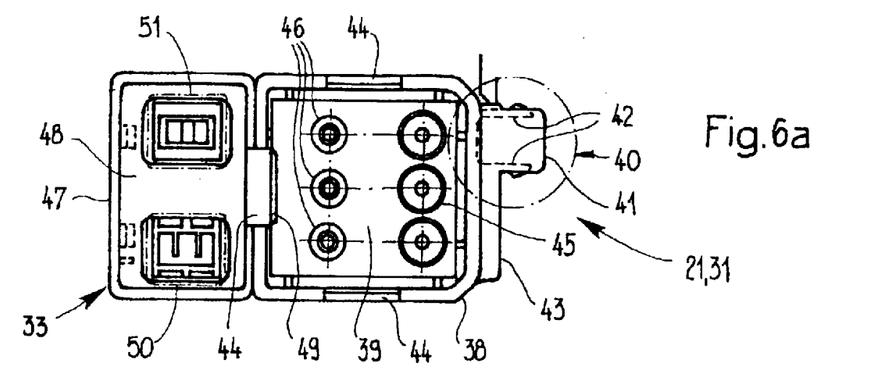
FIG. 6a shows a plan view of a multiple plug for the power supply with a clipped-in EIB multiple plug.

In FIG. 6*a*, a plan view of a multiple plug 21 or 31 for the power supply is represented. The multiple plug 21 or 31 comprises a housing 38 and a multiple coupling insert 39. The latter is clipped into the housing 38 in such a way that, on the one hand, the tensile loads occurring when connecting cables are removed are absorbed and, on the other hand, the removal of this multiple coupling insert 39 is possible in principle. This allows the multiple coupling insert 39 to be inserted into the housing 38 in a way corresponding to the local conditions. Since the slot 7 is not arranged in the middle of the longitudinal struts 5 or 6, when there is alignment of the incoming feed 45 of the multiple coupling insert 39 upward or downward it must be exchangeable by the user [sic]. Furthermore, when there is a defective multiple coupling insert 39, the entire multiple connector does not have to be replaced. Furthermore, the housing can also remain in use if a change is made in the future to a different plug system.

The housing 38 is preferably produced from injection-molded plastic and the edges are in each case beveled. The actual dimensions of this housing 38 are determined by the system plugs used, their size and the resultant space requirement. In a preferred design, the multiple coupling insert 39 of the multiple plug 21 or 31 has an incoming feed 45 and three taps 46. The use of a standardized plug system keeps the multiple plug 21 or 31 dimensionally compact. A plug system which is available on the market, largely meets the requirements for electrification of a modular furniture system and comprises compact plugs is the "gesis" system which is offered by Wieland Electric GmbH from Germany. A plug of this type has a rectangular form, in which the width is approximately one third of the length of the plug. In the case of the plug, preferably three terminals are arranged one behind the other, the middle terminal being the grounding. The relatively flat design of the plug allows two of them to be arranged at a small distance from each other. For esthetic reasons, the width of the multiple plug 21 or 31 is the width of the longitudinal strut 5 or 6. This width in turn is derived from the necessary stability requirements. In this configuration, the width and, since a square cross section is preferred, the length of the multiple plug 21 or 31 is of the same size. The plug used has a length which corresponds to approximately three quarters of the overall length or width of the multiple plug 21 or 31. The preferred square cross section is based on the possibility of being able to fasten the EIB plug on the three free sides of the multiple plug 21 or 31. This is also in consideration of esthetic requirements.

It is found, however, that the size of the longitudinal strut 5 or 6 and the size of the multiple plug 21 or 31 are in a certain relationship. If plugs with dimensions larger than those proposed are used, the multiple plug 21 or 31 may be larger than the dimensions of the longitudinal strut 5 or 6 dictated by stability. Therefore, to ensure the esthetic and functional requirements, the dimensions of the hollow profile 14 would have to be adapted to those of the multiple plug 21 or 31. Conversely, if a plug smaller than the one proposed is used, for example, the dimensions of the multiple plug 21 or 31 would have to be adapted to those of the hollow profile 14. An exemplary embodiment of this problematical matter is represented for example by the EIB multiple plug 33, the length of which is only approximately half the width, since the plugs used of the control elements are much smaller than the plugs of the electrical supply.

The height of the multiple plug 21 or 31 results from the design of the multiple coupling insert 39 and a guide part which is arranged on each of both sides, preferably upward and downward, and makes possible, for example, a coding by the design of the bevels of the housing 38. Furthermore, safety and esthetic requirements for the accommodation of such a plug have an influence on the height of the guide part, but not only on this. In the configuration represented, the height is approximately one and a half times the width or length of the multiple plug 21 or 31.

The housing 38 has a clip-in mechanism 40, which makes it possible to make the multiple plug 21 or 31 engage in the slot 7 of one of the vertical longitudinal struts 5 or 6 and, if need be, also remove it again without destroying it. Without destroying it in this [sic] sense that the multiple plug 21 or 31 can be displaced as desired or mounted on a different longitudinal strut 5 or 6 than the previous one and be removed.

This clip-in mechanism preferably comprises a horizontal guide tab 41 arranged respectively at the top and bottom, and two inwardly movable, vertically arranged tongues 42. The horizontal guide tabs 41 are arranged on the uppermost edge and lowermost edge, respectively just below or above the beveling of the edges. The dimensions of the length and width of the horizontal guide tabs 41 is [sic] determined by the size of the slots 7 in the vertical longitudinal struts 5 or 6. The thickness of the horizontal guide tab 41 is determined by stability considerations and, in this exemplary embodiment, is approximately 3 mm. Furthermore, additional horizontal spacers 43 are arranged on the actual guide tabs 41 at the same height as the actual guide tabs 41. These spacers 43 are made only approximately half as thick as the actual guide tabs 41 and are placed on the uppermost edge and lowermost edge of the guide tab 41. The length of the spacers amounts to the overall width of the multiple plug 21 or 31 minus the respective bevels and the width of the actual guide tab 41.

The vertical tongues 42 have a length of approximately four fifths of the overall height of the multiple plug 21 or 31. The depth of penetration of these vertical tongues 42 is dependent on the wall thickness of the hollow profile 14 of the vertical longitudinal struts 5 or 6. At the ends which penetrate into the slots 7 of the vertical longitudinal struts 5 or 6, the vertical tongues 42 have thickened portions, which are designed in such a way that they reach around the edge of the hollow profile 14. By evenly pressing on the side of the multiple plug 21 or 31 lying opposite the vertical tongues 42, they are bent inward, toward each other, from the viewpoint of the tongues 42. As soon as the thickened portions has [sic] reached a depth of penetration which is greater than the wall thickness of the hollow profile 14, the multiple plug 21 or 31 automatically engages. If the vertical tongues 42 are pressed back toward each other, the multiple plug 21 or 31 can be removed without destroying it.

In this exemplary embodiment, recesses 44 for fastening an EIB multiple plug 33 are provided on the remaining three outer sides of the housing 38. As a variant of the design shown of the housing 38, one or more sides of the housing 38 of the multiple plug 21 or 31 may also be designed with recesses in such a way that a further multiple plug 21 or 31 could be fastened on such a side.

Figure 6B:
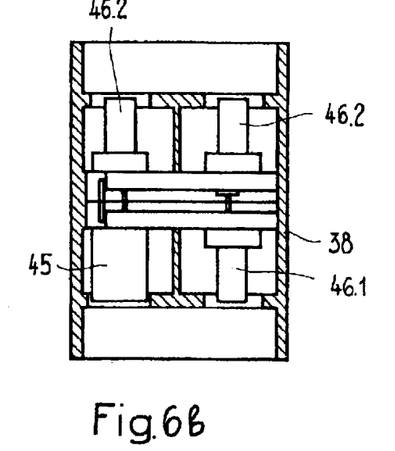
FIG. 6b shows a section through a multiple plug for the power supply.

A preferred arrangement of the incoming feed 45 and the taps 46 is represented on the basis of FIG. 6b, which represents a section through the multiple plug 21 or 31. The symmetrical design of the multiple plug 21 or 31 and the exchangeable multiple coupling insert 39 allow it to be fastened in two directions on the vertical longitudinal strut 5 or 6. If the power supply cable 23 or 31 is led from the ceiling of the modular furniture system, the incoming feed 45 is preferably aligned in the direction of the ceiling. If it is led from the floor, the incoming feed is preferably aligned in the direction of the floor. In FIGS. 4 and 5, leading from the floor is assumed, for which reason such an alignment of the multiple plug 21 or 31 and also of the EIB multiple plug 33 is taken as a basis in the description which follows. The compactness of the multiple plug 21 or 31 is of decisive significance. The tap 41.6 arranged next to the incoming feed 45 is aligned in the same direction as the incoming feed 45 and is reserved in principle for supplying to the neighboring frame. The two remaining taps 46.2, arranged in the opposite direction from the incoming feed 45 and the neighboring tap 46.1, serve for the supply to electrical equipment and the lighting.

Like the multiple plug 21 or 31, the EIB multiple plug 33 comprises a housing 47, in which a multiple coupling insert 48 is exchangeably clipped. Like the multiple coupling insert 39 of the multiple plug 21 or 31, the multiple coupling insert 48 is clipped into the housing 47 in such a way that tensile loads occurring when cables are removed can be absorbed. Furthermore, the statements made with respect to the multiple coupling insert 39 apply analogously, since exchanging of the multiple coupling insert 48 is also desired.

Figure 6C:
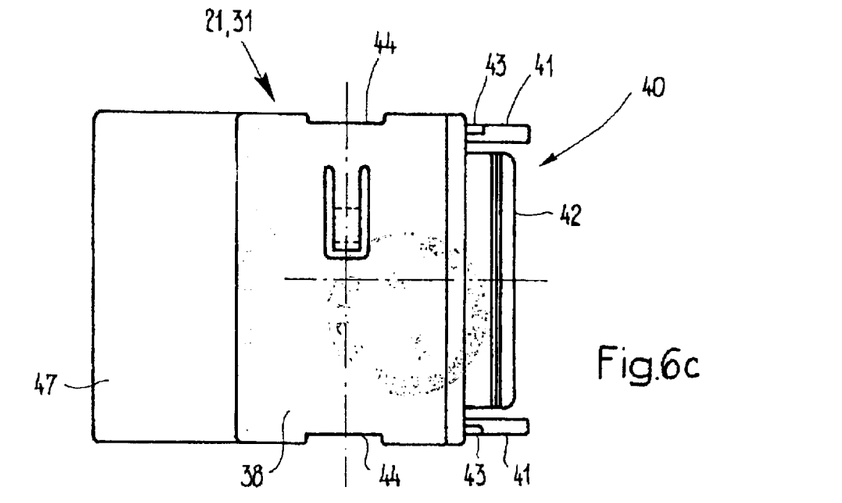
FIG. 6c shows a view of a multiple plug for the power supply with a clipped-in EIB multiple plug.

Since the housing 47 of the EIB multiple plug 33 is preferably made to engage on one of the still available outer sides of the multiple plug 21 or 31, the latter is provided on at least one outer side with a tab 49 respectively arranged at the top and bottom. The EIB multiple plug 33 preferably has the same width and height as the multiple plug 21 or 31. The length of the EIB multiple plug 33 is determined by the use of the corresponding plugs. Application of the EIB system is based on low voltage in the range from 12 to 24 V. As a result, the dimensions are considerably smaller in comparison with a power supply based on 230 V or 120 V, which has a decisive influence on the dimensions of the EIB multiple plug 33. In this exemplary embodiment, the length is approximately half the width of the EIB multiple plug 33. To achieve secure fastening of the EIB multiple plug 33 to the multiple plug 21 or 31, the horizontal tabs 49 of the EIB multiple plug 33, which have a length of approximately one third of the width of the EIB multiple plug 33, have thickened portions on the side facing away from the housing wall. By applying pressure to the outer side of the EIB multiple plug 33 lying opposite the horizontal tabs 49, they are pressed apart, with respect to the tabs 49. As soon as the thickened portions have overcome the protruding part of the, recess 44, the horizontal tabs 49 automatically engage. By pressing the horizontal tabs 49 apart, the EIB multiple plug 33 can be removed without destroying it from the multiple plug 21 or 31 and fitted again later on a different multiple plug 21 or 31 or a different outer side of a housing 38. Since recesses for fastening are provided on three of the four sides of the multiple plug 21 or 31, the EIB multiple plug 33 can be arranged in different positions according to circumstances or user-specific wishes.

The clip-in mechanism of the EIB multiple plug may be designed in a way corresponding to the multiple plug 21 or 31. In this way, direct fastening of an EIB multiple plug 33 in the slot 7 of a longitudinal strut 5 or 6 would be possible. In the embodiment represented, however, fastening of the EIB multiple plug 33 on one of the three available sides of the multiple plug 21 or 31 is preferred.

In the case of the systems of clip-in mechanisms described, one of a number of embodiments of such a system is concerned. The tabs 49 of the EIB multiple plug 33 could also be arranged slightly offset inward. The recesses 44 in the multiple plug 21 or 31 would have to be designed correspondingly.

Like the multiple coupling insert 39 of the multiple plug 21 or 31, the multiple coupling insert 48 of the EIB multiple plug 33 is preferably provided with an incoming feed 50 and three taps 51. To retain the concept of compactness here, too, the plugs are arranged in a way corresponding to the multiple coupling insert 39. Furthermore, the statements made with respect to the multiple coupling insert 39 apply analogously.

Figure 7:
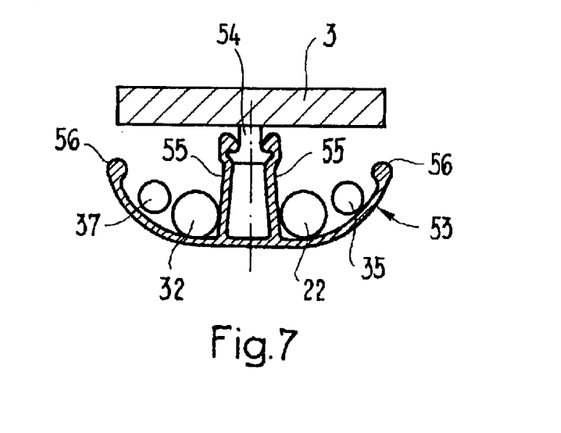
FIG. 7 shows a section through a cable tray for receiving cables.

In FIG. 7, a section through a cable tray 53 for receiving cables 22, 32, 35 and 37 is shown. The cable tray 53 is of a relatively flat design, that is to say it has a width which is greater than its height. Viewed in cross section, it preferably has a rounded profile. For example, the stay 3 or the part of the structural element on which the cable or cables are to be indirectly held is provided with stud-head screws 54. The number of these stud-head screws 54 per part of the structural element is dependent on the length of said part or the cable tray. The cable tray 53 is provided with a clip-in mechanism, which has, for example, two tongues 55 arranged in the region of the center axis of the cable trays [sic] 53. These tongues 55 may be led over the entire length of the cable tray 53 or only arranged locally, corresponding to the position of the stud-head screws 54. By applying pressure on the outer side of the cable tray 53, preferably in the vicinity of the stud-head screws 54, in the direction of the stay 3, the cable tray 53 is clipped in. As a consequence of the simple fastening construction, the cable tray 53 can be manually removed again if need be, by pulling on it. The mushroom-shaped head of the stud-head screws 54 provide the pincer-shaped tongues 55 with an engaging hold.

Once the cables 22, 32, 35 and 37 have been laid in the cable tray 53, the latter is clipped onto the stay 3. In the clipped-in state, the edges 56 of the cable tray 53 are preferably not taken up to the stay 3. The remaining gap is of such a size that any additional cables can be subsequently pushed laterally into the cable tray 53, without the cable tray 53 having to be removed for this purpose. It is also conceivable for such a gap to be created only on one side. For reasons of durability and esthetics, the edges 56 are preferably of a thickened design. Apart from the fastening of the cable tray 53 to the stay 3, fastening to any other part of the structural element is also conceivable, for example also to the stay 4. Furthermore, other types of fastening are also conceivable (screw connections, hook connections, etc.). Instead of straight and rigid cable trays, bent cable guides or flexible cable tubes or cable chains (link chains) may also be attached of course.

To sum up, it can be stated that the flexibility and modularity of electrified furniture systems can be decisively increased by the invention. At the same time, electrification which satisfies esthetic, safety and modular requirements has been created. This is achieved, on the one hand, in a very user-friendly way and, on the other hand, by simple means which can be used without the involvement of specialists.

What is claimed is:

1. A modular furniture system with electrification, comprising:

a plurality of structural elements formed for receiving functional furniture units, each of the structural elements forming a closed, vertical rectangular frame comprising two vertical longitudinal struts and two stays horizontally connecting them, where the electrification has at least one multiple plug which can be fastened to one of the vertical longitudinal struts and cables of a predetermined length which are held on one of the stays as an electrical connection between multiple plugs of two neighboring structural elements.

2. The modular furniture system according to claim 1, wherein for each of the plurality of structural elements the electrification takes place from a first side and the at least one multiple plug is fastened to the vertical longitudinal strut on a second side, opposite to the first side, where an orientation of the first side and of the second side is the same for every structural element.

3. The modular furniture system according to claim 1 or 2, wherein the electrification additionally has at least one button or switch or sensor which can be fastened to a part of the structural element.

4. The modular furniture system according to claim 1, wherein the multiple plug and the button or switch can be displaceably fastened to a part of the structural element.

5. The modular furniture system according to claim 1, wherein the longitudinal struts have on sides which are aligned parallel to a plane formed by the rectangular frame fastening means for the multiple plug and/or the button or switch.

6. The modular furniture system according to claim 5, wherein the fastening means are slots running in the longitudinal direction.

7. The modular furniture system according to claim 1, wherein the cables electrically connecting the multiple plugs of two neighboring structural elements are held in a cable carrier arranged on the stay.

8. The modular furniture system according to claim 7, wherein the cable carrier is designed in such a way that it can be clipped onto the stay by means of a snap mechanism.

9. The modular furniture system according to claim 7 or 8, wherein the cable carrier is a dish in the form of a duct having at least on one side an edge leaving a free space between the stay and the edge.

10. The modular furniture system according to claim 1, wherein the cables have a length which corresponds to a length of a stay plus one fifth to a complete length of a longitudinal strut.

11. The modular furniture system according to claim 1, wherein a holder which can be detachably fastened on the at least one multiple plug for acting as control elements.

12. The modular furniture system according to claim 11, wherein the control elements are provided for cabling on the basis of European Installation Bus (EIB), Digital Addressable Lightning Interface (DALI), or Local Area Network (LAN).

13. The modular furniture system according to claim 1, wherein the multiple plug has a housing and an exchangeable multiple coupling insert.

14. The modular furniture system according to claim 13, wherein the housing has, on at least one outer side, a clip-in mechanism for fastening to a part of the structural element.

15. The modular furniture system according to claim 13 or 14, wherein the housing has on the inside at least one clip-in mechanism for fastening the multiple coupling insert in the housing.

16. The modular furniture system according to one of claim 13 or 14, wherein the housing has on at least one side at least one recess for fastening another multiple plug.

17. The modular furniture system according to one of claim 13 or 14, wherein the housing has a tubular form, in particular that of a prism, without any termination underneath and on top.

18. The modular furniture system according to one of claim 13 or 14, wherein the multiple coupling insert has at least one incoming feed and at least two taps.

19. The modular furniture system according to one of claim 13 or 14, wherein the multiple coupling insert has a clip-in mechanism for fastening in the housing.

* * * * *

UNITED STATES PATENT AND TRADEMARK OFFICE
CERTIFICATE OF CORRECTION

PATENT NO.     : 6,830,468 B2
DATED          : December 14, 2004
INVENTOR(S)    : Alexander Schaerer, André Gerber and Antonio Cassani It is certified that error appears in the above-identified patent and that said Letters Patent is hereby corrected as shown below:

Title page,
Item [30], Foreign Application Priority Data, should read
-- May 19, 2000 (EP) ................................................... 00810434 --

Signed and Sealed this

Nineteenth Day of April, 2005

JON W. DUDAS
*Director of the United States Patent and Trademark Office*